US010687469B2

(12) United States Patent
Ricketts et al.

(10) Patent No.: US 10,687,469 B2
(45) Date of Patent: Jun. 23, 2020

(54) ACTIVE CROP DIVIDER FOR A HEADER

(71) Applicant: CNH Industrial America LLC, New Holland, PA (US)

(72) Inventors: Jonathan E. Ricketts, Coal Valley, IL (US); Herbert M. Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 144 days.

(21) Appl. No.: 15/901,107

(22) Filed: Feb. 21, 2018

(65) Prior Publication Data
US 2019/0254232 A1 Aug. 22, 2019

(51) Int. Cl.
*A01D 63/02* (2006.01)
*A01D 69/03* (2006.01)

(52) U.S. Cl.
CPC ............. *A01D 63/02* (2013.01); *A01D 69/03* (2013.01)

(58) Field of Classification Search
CPC ...... A01D 63/02; A01D 69/03; A01D 45/021; A01D 43/02; A01D 45/02; A01D 57/22; A01D 65/00; A01B 77/00
See application file for complete search history.

(56) References Cited

U.S. PATENT DOCUMENTS

| 393,774 A | 12/1888 | McAlister |
| 1,901,099 A * | 3/1933 | Hale ...................... A01D 45/02 56/102 |
| 2,459,961 A * | 1/1949 | Pollard .................. A01D 78/14 56/372 |
| 2,783,606 A * | 3/1957 | Wilson ................. A01D 89/007 56/364 |
| 2,811,006 A * | 10/1957 | Heth ...................... A01D 63/04 56/315 |
| 3,096,604 A | 7/1963 | Baker et al. |
| 3,125,845 A * | 3/1964 | Lee ........................ A01D 41/10 56/364 |
| 3,331,196 A | 7/1967 | Grant |
| 3,456,429 A * | 7/1969 | Sexton, Jr. ............. A01D 45/10 56/13.7 |

(Continued)

FOREIGN PATENT DOCUMENTS

| CA | 2287701 A1 | 2/2000 | |
| DE | 3338812 A1 * | 5/1985 | ............. A01D 57/30 |

(Continued)

OTHER PUBLICATIONS

Extended European Search Report for EP Application No. 19158171.9 dated Jun. 25, 2019 (6 pages).

*Primary Examiner* — Arpad Fabian-Kovacs
(74) *Attorney, Agent, or Firm* — Peter Zacharias; Patrick Sheldrake

(57) ABSTRACT

An agricultural vehicle including a chassis and a header connected to the chassis. The header includes a frame and at least one crop divider rotatably connected to the frame at an axis of rotation. The at least one crop divider is configured for dividing and lifting a crop material. The header also includes at least one drive unit mounted to the frame and operably connected to the at least one crop divider such that as the header is moved in a forward direction the at least one drive unit rotates the at least one crop divider about the axis of rotation.

16 Claims, 3 Drawing Sheets

(56) References Cited

U.S. PATENT DOCUMENTS

| | | | | |
|---|---|---|---|---|
| 3,584,444 A | * | 6/1971 | Sammann | A01D 45/021 56/119 |
| 3,646,737 A | | 3/1972 | Grant | |
| 3,664,101 A | * | 5/1972 | Hurlburt | A01D 57/03 56/220 |
| 3,678,669 A | * | 7/1972 | Czajkowski | A01D 43/02 56/314 |
| 3,726,345 A | * | 4/1973 | Harrell | A01D 29/00 171/101 |
| 4,015,667 A | * | 4/1977 | Ruozi | A01B 77/00 172/133 |
| 4,154,047 A | * | 5/1979 | Quick | A01D 45/10 56/13.9 |
| 4,182,103 A | * | 1/1980 | McNutt | A01D 43/02 56/15.8 |
| 4,346,548 A | * | 8/1982 | Atkinson | A01D 45/021 56/119 |
| 4,416,334 A | * | 11/1983 | Bouillon | A01D 17/06 171/126 |
| 4,476,667 A | * | 10/1984 | Moss | A01D 45/021 56/106 |
| 4,524,571 A | | 6/1985 | Mak et al. | |
| 4,584,825 A | * | 4/1986 | Atkinson | A01D 45/021 56/119 |
| 5,878,559 A | | 3/1999 | Cooksey et al. | |
| 6,032,444 A | * | 3/2000 | Herron | A01D 43/082 56/102 |
| 6,205,752 B1 | * | 3/2001 | Hess | A01D 34/664 56/6 |
| 6,264,554 B1 | * | 7/2001 | Badry | A01D 34/23 460/131 |
| 6,282,876 B1 | * | 9/2001 | Patterson | A01D 65/08 56/119 |
| 6,282,877 B1 | * | 9/2001 | Yoder | A01D 45/00 460/145 |
| 6,457,302 B1 | | 10/2002 | McCrea et al. | |
| 8,371,097 B1 | * | 2/2013 | McClure | A01F 15/106 56/341 |
| 8,413,413 B2 | * | 4/2013 | Lohrentz | A01D 45/021 56/95 |
| 9,668,409 B2 | * | 6/2017 | Mello | A01D 45/10 |
| 2004/0231309 A1 | * | 11/2004 | Rickert | A01D 63/02 56/119 |
| 2006/0201126 A1 | * | 9/2006 | Remillard | A01D 57/02 56/58 |
| 2011/0232246 A1 | * | 9/2011 | Muthing | A01D 65/04 56/1 |
| 2013/0186052 A1 | * | 7/2013 | Koehn | A01D 45/021 56/119 |
| 2017/0049056 A1 | * | 2/2017 | Wenger | A01D 57/06 |
| 2018/0295777 A1 | * | 10/2018 | Mosel | A01D 34/66 |

FOREIGN PATENT DOCUMENTS

| | | | | |
|---|---|---|---|---|
| DE | 10012056 A1 | 10/2001 | | |
| DE | 10206541 A1 | 8/2003 | | |
| GB | 2172484 A | * | 9/1986 | A01D 57/02 |

* cited by examiner

ACTIVE CROP DIVIDER FOR A HEADER

FIELD OF THE INVENTION

The present invention pertains to headers for agricultural vehicles and, more specifically, to headers which include crop dividers.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A typical header generally includes a frame, a pair of end dividers at the lateral ends of the frame, a cutter to remove crop material from the field, and a conveyor to transport the cut crop material to the feeder housing for further downstream processing in the combine. These features of a typical header are generally specifically optimized to harvest a particular kind of crop material. For instance, the header may be in the form of a draper header which has a cutter bar, a draper belt, and a rotating reel with tines or the like in order to harvest a bushy or fluffy crop material, such as soy beans or canola.

Crop dividers on a header, such as lateral end dividers, can cause a decrease in yield because the crop dividers may ineffectively direct crop material into the header. For example, some end dividers may push or lay crop material over as it divides a row of crop material, and thereby, on a subsequent pass it may be difficult to harvest the down crop material which the end dividers have pushed or laid over. Additionally, for example, the shape of some dividers may cause an operator to stop the harvesting process and physically remove the lodged crop material.

Some headers may further include a down crop attachment located on one or more crop dividers in order to move bent, fallen, or lodged crop material from the front of the header towards the conveyor. A down crop attachment may include a rotating chain or belt located at the center of the crop divider. Incorporating a down crop attachment can decrease economic loss, since the bent, fallen, and/or lodged crop material would not otherwise be gathered into the header. Additionally, the down crop attachment will increase the harvesting efficiency as the operator does not need to stop the harvesting process to clean lodged crop material from the header as often. However, down crop attachments may be complex and cumbersome to maintain. Additionally, some down crop attachments can undesirably increase the overall weight of the header.

What is needed in the art is a cost effective and efficient crop gathering attachment for dividing and harvesting a crop material.

SUMMARY OF THE INVENTION

In one exemplary embodiment formed in accordance with the present invention, there is provided a header that includes rotating end crop dividers and drive units for rotating the end crop dividers in order to separate and lift crop material into the header.

In another exemplary embodiment formed in accordance with the present invention, there is provided an agricultural vehicle including a chassis and a header connected to the chassis. The header includes a frame and at least one crop divider rotatably connected to the frame at an axis of rotation. The at least one crop divider is configured for dividing and lifting a crop material. The header also includes at least one drive unit mounted to the frame and operably connected to the at least one crop divider such that as the header is moved in a forward direction the at least one drive unit rotates the at least one crop divider about the axis of rotation.

In another exemplary embodiment formed in accordance with the present invention, there is provided a header for an agricultural vehicle including a frame and at least one crop divider rotatably connected to the frame at an axis of rotation. The at least one crop divider is configured for dividing and lifting a crop material. The header also includes at least one drive unit mounted to the frame and operably connected to the at least one crop divider such that as the header is moved in a forward direction the at least one drive unit rotates the at least one crop divider about the axis of rotation.

In yet another exemplary embodiment formed in accordance with the present invention, there is provided a method for operating an agricultural vehicle. The method includes the step of providing a header configured for connecting to the agricultural vehicle. The header includes a frame, at least one crop divider rotatably connected to the frame at an axis of rotation, and at least one drive unit mounted to the frame and operably connected to the at least one crop divider. The method includes the further steps of rotating the at least one crop divider by the at least one drive unit about the axis of rotation as the header is moved in a forward direction, dividing a standing crop material by the at least one crop divider, and lifting a down crop material into the header by the at least one crop divider.

One possible advantage of the exemplary embodiment of the header is that the active crop divider can efficiently divide and lift the crop material into the header instead of flattening or pushing the crop material in the direction of machine travel.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
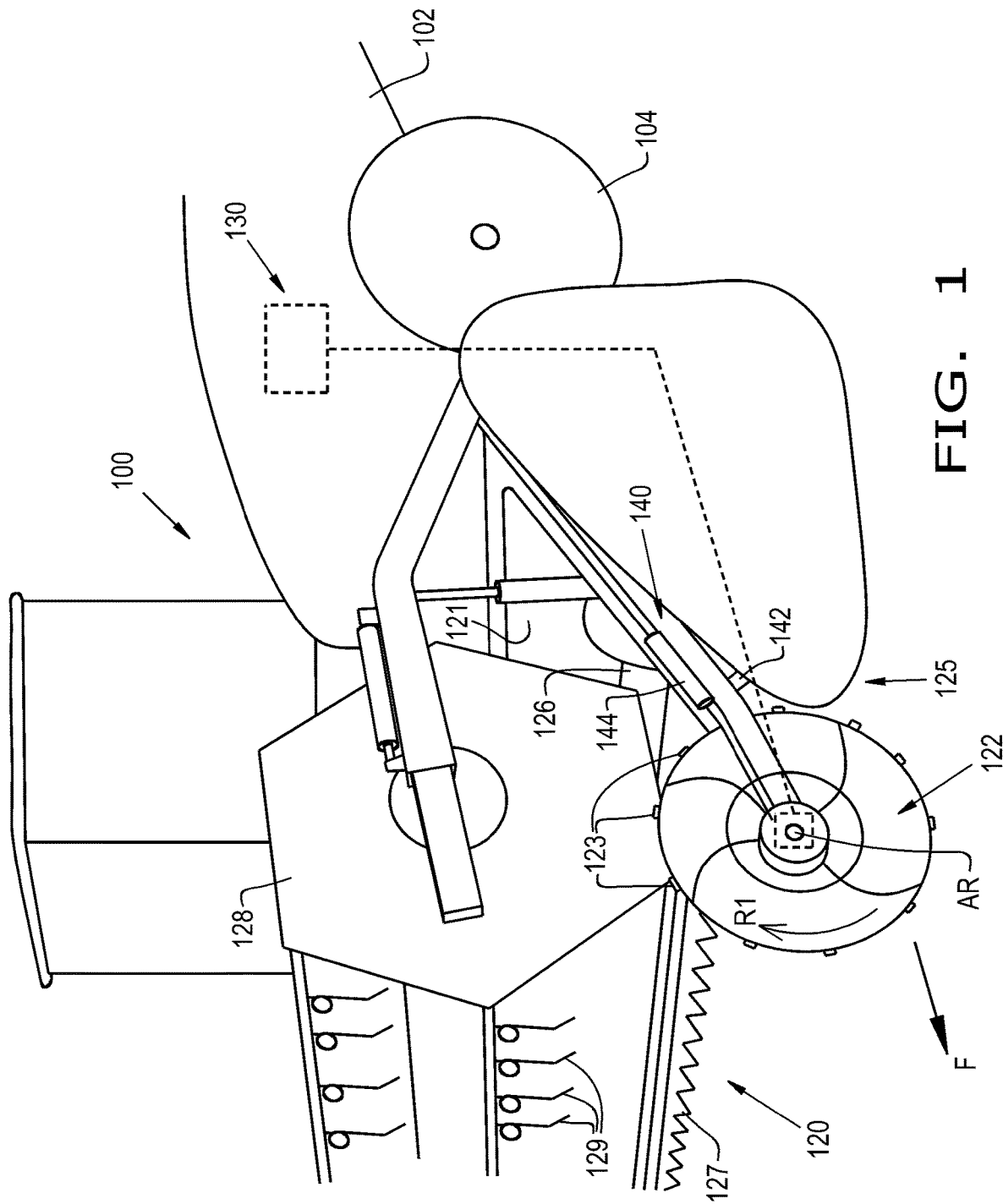
FIG. 1 illustrates a perspective view of an agricultural vehicle with a header that has an active, rotating crop divider, in accordance with an exemplary embodiment of the present invention.
Figure 2:
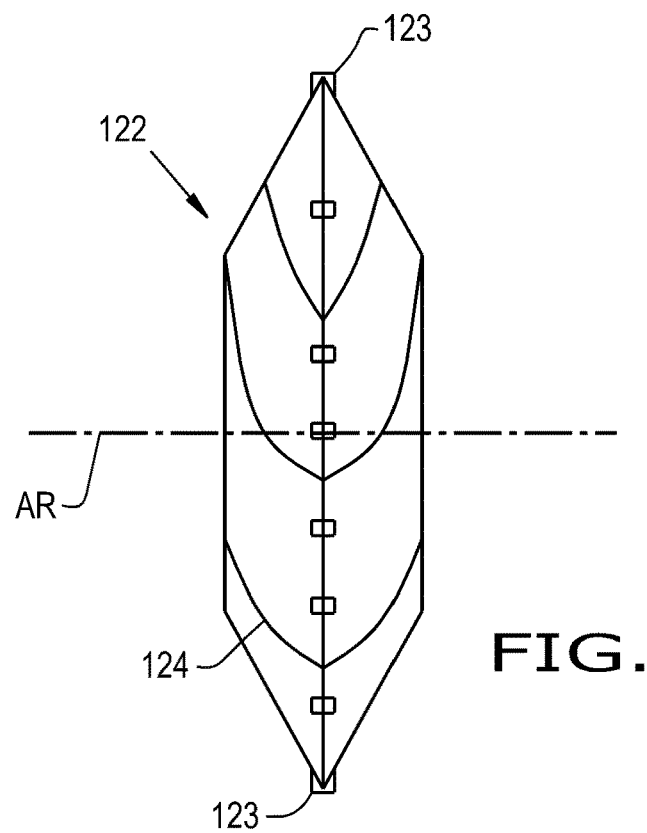
FIG. 2 illustrates a front view of the rotating crop divider of FIG. 2, in accordance with an exemplary embodiment of the present invention.
Figure 3:
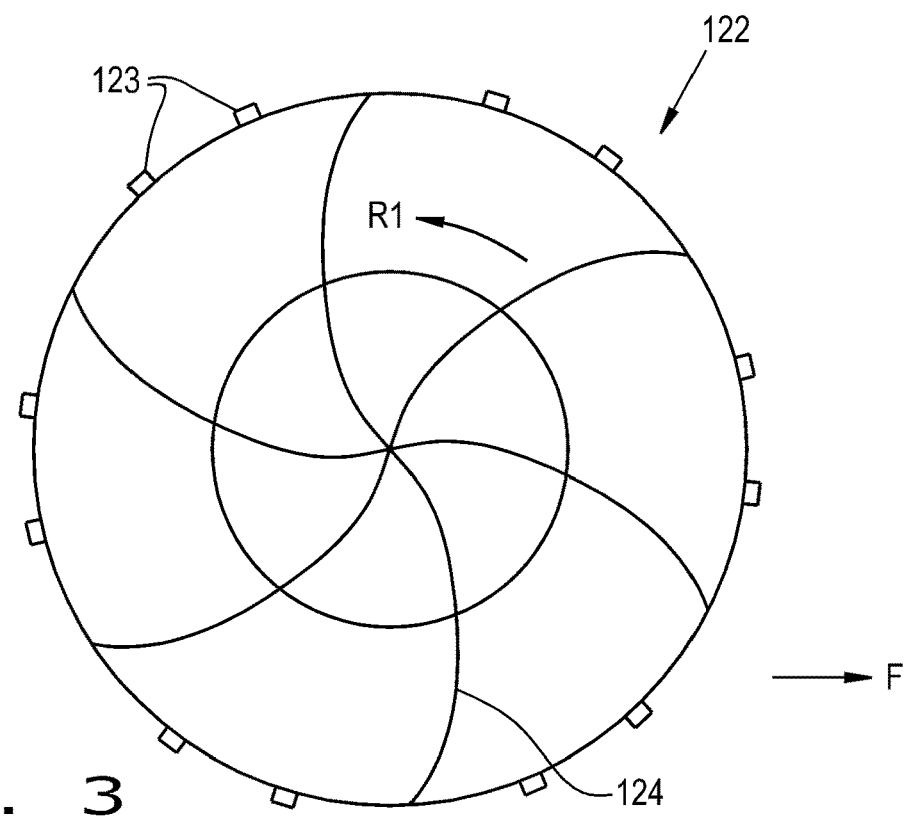
FIG. 3 illustrates a side view of the rotating crop divider of FIG. 2, in accordance with an exemplary embodiment of the present invention.

Referring now to the drawings, and more particularly to FIGS. 1-3, there is shown an agricultural vehicle 100 in the form of a combine harvester 100 which traverses a field in a forward direction, denoted by arrow "F". The agricultural vehicle 100 generally includes a chassis 102, wheels 104, and a header 120 connected to the chassis 102. It should be appreciated that the header 120 may be incorporated in any agricultural vehicle such as a combine, a windrower, or any other prime mover that is used for cutting crop material.

The header 120 may be in the form of any desired header, such as a grain header. As shown in FIG. 1, the header 120 is in the form of a grain header 120 which generally includes a frame 121, at least one end crop divider(s) 122, having protuberances 123 and fins 124, that is located at the lateral end(s) 125 of the frame 121, a conveyor 126, a cutter bar 127, and a rotating reel 128 with tines 129. The header 120 may also include one or more drive units 130 for driving the end crop divider(s) 122 and actuating systems 140 for adjusting the position of the end crop divider(s) 122. The header 120 may additionally include various components and systems for the collection and transportation of the crop material; however, such components and systems have been hidden from view for brevity of description.

In the exemplary embodiment shown, a crop divider 122 is positioned at each lateral end 125 of the frame 121 of the header 120. The end crop dividers 122 divide and lift the crop material as the agricultural vehicle 100 is moved in the forward direction F. The end crop dividers 122 are rotatably connected to the frame 121 and rotate in a rotational direction R1 about an axis of rotation AR. The axis of rotation AR may be substantially perpendicular to the forward direction F, plus or minus approximately 15 degrees. The end crop dividers 122 may have any desired shape, such as elliptical, trapezoidal, conical, or spherical, which provides positive contact with and effectively divides the crop material. For example, the end crop dividers 122 may have a disk-shaped body. The disk-shaped-body can be in the form of a prolate spheroid which has been truncated at its left and right sides (FIG. 2). The end crop divider 122 may be symmetrical or non-symmetrical. For example, the end crop divider 122 may be two-sided as shown, such that the end crop divider 122 is symmetrical, or the end crop divider 122 may be one-sided such that one side has a disked-shape and the other side is substantially flat (not shown). The end crop dividers 122 may be composed of any suitable material such as metal, plastic, and/or rubber. In operation, the end crop dividers 122 will lift and divide standing or down crop material. The disked-shape design of the end crop dividers 122 allows the crop material to gently fall inwardly into the header 120 or outwardly away from the header 120.

The protuberances 123 of the end crop divider 122 perform a raking function in which the protuberances 123 contact and gently lift the crop material. The protuberances 123 may be in the form of a plurality of fingers 123 extending outwardly from an outer surface of the end crop divider 122. However, the protuberances 123 may be in the form of ribs, flaps, spikes, nodules, and/or a textured surface. The protuberances 123 may be located anywhere along the outer surface of the end crop divider 122. For example, the protuberances 123 may be located around the center perimeter of the end crop divider 122. The protuberances 123 may be fixedly attached to the end crop dividers 122, or the protuberances 123 may be retractable.

The fins 124 of the end crop dividers 122 are configured for preventing the crop material from being lodged in between a respective end crop divider 122 and the frame 121 of the header 120. The fins 124 may be in the form of grooves or protrusions on the outer surface of the end crop dividers 122 that can effectively contact the crop material. The fins 124 of the end crop divider 122 may be located on the sides of the end crop divider 122, and the fins 124 may spiral outwardly from the axis of rotation AR. It should be appreciated that the fins 124 may be located at any desired location on the end crop dividers 122, and the fins 124 may form any desired pattern.

The drive unit 130 is mounted to the frame 121 and operably connected to the end crop divider 122 such that as the header 120 is moved in the forward direction F, the drive unit 130 rotates each end crop divider 122 about the axis of rotation AR. The drive unit 130 can allow for variable speeds in order to better lift and separate the crop material prior to the crop material coming into contact with the reel 128. As discussed in more detail below with respect to FIGS. 4-5, the drive unit 130 may be in the form of a hydraulic drive or an electric drive. Additionally, the drive unit 130 may be in the form of a mechanical driving wheel (not shown). For instance, the drive unit 130 may include a driving wheel that is rotatably mounted to the frame 121 via a shaft, and the drive wheel may contact the field and the end crop divider 122 as it rotates in order to rotate the end crop divider 122 in the opposite direction.

The actuating systems 140, respectively located at the lateral ends 125 of the frame 121, may include one or more actuator(s) connected to the frame 121 for adjusting the end crop dividers 122. As shown, the actuating system 140 includes two actuators 142, 144 for respectively adjusting a respective end crop divider 122. Hence, the actuating systems 140 may respectively raise, lower, rearwardly move, and/or forwardly move the end crop dividers 122. The actuating system 140 may move the end crop dividers 122 in between a stored, retracted position and an active, crop contacting position. It should be appreciated that the actuating systems 140 may include additional actuators for changing the camber angle of the end crop dividers 122.

Figure 4:
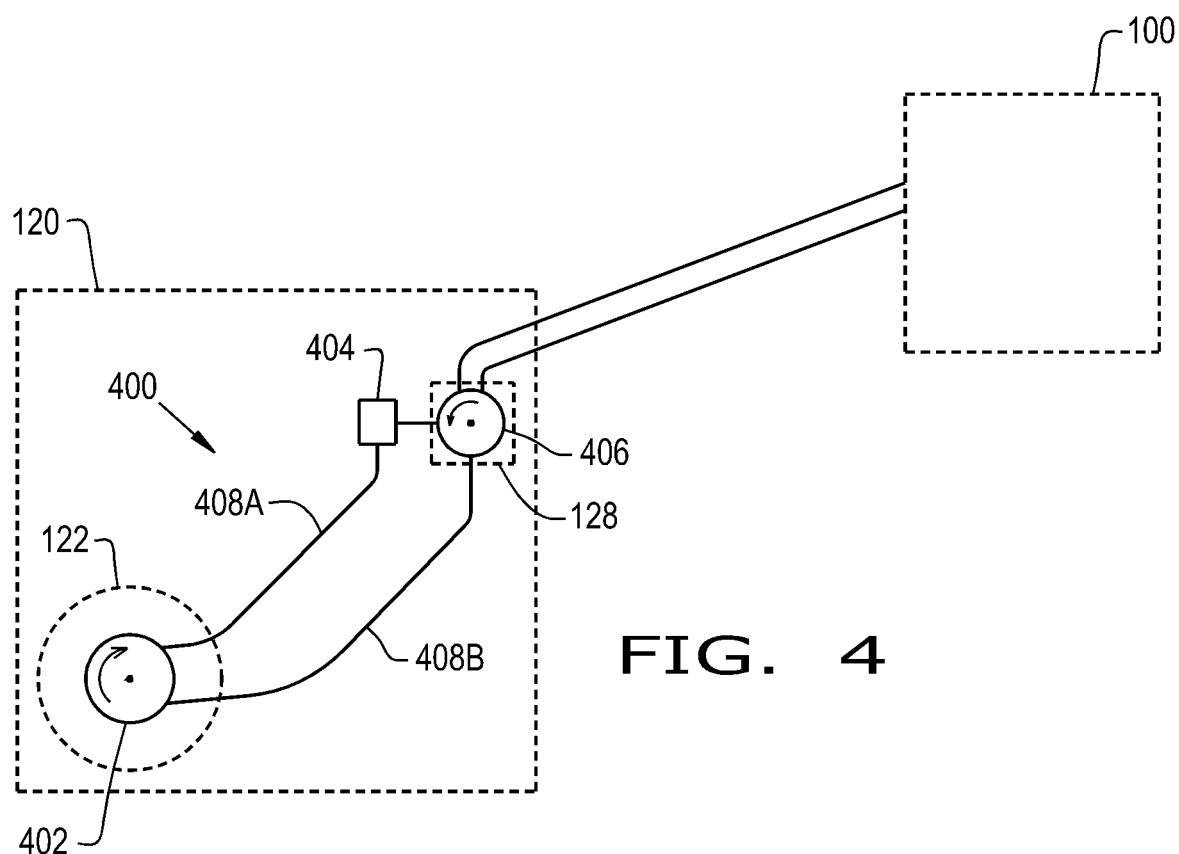
FIG. 4 illustrates a schematic view of a hydraulic drive unit, in accordance with an exemplary embodiment of the present invention.
Figure 5:
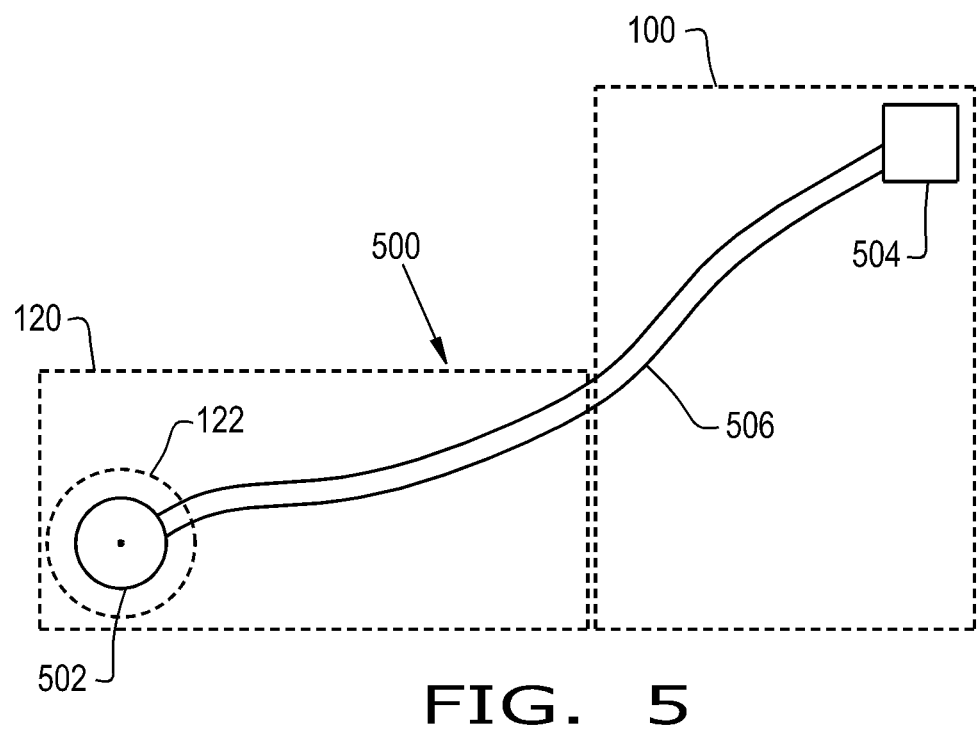
FIG. 5 illustrates a schematic view of an electric drive unit, in accordance with an exemplary embodiment of the present invention.

Referring now to FIGS. 4-5, there is shown schematic representations of the drive unit 130 in the form of a hydraulic drive 400 (FIG. 4) and an electric drive 500 (FIG. 5), respectively. It should be appreciated that the agricultural vehicle 100 may include either or both hydraulic and electric drive units 400, 500 in order to drive the end crop dividers 122. It is noted that FIG. 1 shows the drive unit 130 in the form of an electric drive unit 500.

The hydraulic drive unit 400 generally includes a divider hydraulic motor 402 operably connected to and driving the end crop divider 122 and a control valve 404. The divider hydraulic motor 402 is fluidly coupled to a reel hydraulic motor 406 via hydraulic lines 408A, 408B. The reel hydraulic motor 406 is attached to and drives the reel 128 in a known manner. As the reel hydraulic motor 406 operates, the control valve 404 may proportionally control the speed of the divider hydraulic motor 402 by controlling the flow of hydraulic fluid in and out of the fluid lines 408A, 408B. The divider hydraulic motor 402 and the reel hydraulic motor 406 may rotate in opposite directions. It is conceivable that the divider hydraulic motor 402 may instead be operably connected to a different hydraulic component of the header 120, such as the hydraulic motor of the cutter bar 127, and/or the agricultural vehicle 100.

The electric drive unit 500 generally includes an electric motor 502 and a controller 504 electrically interconnected via an electrical line 506. The electric motor 502 is operably coupled to the end crop divider 122. The controller 504 may selectively control the speed of the electric motor 502 in order to speed up or slow down the end crop divider depending upon various crop conditions. The controller 504 may be located on the agricultural vehicle 100 or on the header 120. It should be appreciated that the electric motor 502 and the controller 504 may be operably coupled via wireless communication instead of the electrical line 506.

The controller 504 may be in the form of any desired electronic control unit (ECU), and the controller 504 may be incorporated into existing hardware and/or software of the agricultural vehicle 100. The controller 504 may include software code or instructions which are tangibly stored on a tangible computer readable medium. The computer readable medium may be in the form of a magnetic medium, e.g., a computer hard drive, an optical medium, e.g., an optical disc, solid-state memory, e.g., flash memory, or other storage media known in the art. Thus, any of the functionality performed by the controller 504 described herein may be implemented in software code or instructions which are tangibly stored on the tangible computer readable medium. Upon loading and executing such software code or instructions by the controller 504, the controller 504 may perform any of the functionality described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler.

As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
    a chassis; and
    a header connected to the chassis and configured to be moved in a forward direction by said agricultural vehicle, and said header including:
        a frame;
        at least one crop divider rotatably connected to the frame at an axis of rotation, which is substantially perpendicular to the forward direction, and said at least one crop divider is configured for dividing and lifting a crop material, and said at least one crop divider comprising a spheroidal body; and
        at least one drive unit mounted to the frame and operably connected to said at least one crop divider such that as the header is moved in the forward direction said at least one drive unit rotates said at least one crop divider about the axis of rotation.

2. The agricultural vehicle of claim 1, wherein said at least one crop divider includes a plurality of protuberances.

3. The agricultural vehicle of claim 2, wherein said plurality of protuberances are in the form of a plurality of fingers extending outwardly from an outer surface of said at least one crop divider.

4. The agricultural vehicle of claim 1, wherein said at least one crop divider includes a plurality of fins configured for contacting the crop material and preventing the crop material from being lodged in between said at least one crop divider and the frame of the header.

5. The agricultural vehicle of claim 1, wherein said header has a pair of lateral ends, and said at least one crop divider is in the form of a pair of end crop dividers which are respectively located at the lateral ends of the frame of the header.

6. The agricultural vehicle of claim 1, wherein said at least one drive unit includes at least one of a hydraulic motor and an electric motor operably coupled to said at least one crop divider and configured for rotating said at least one crop divider.

7. The agricultural vehicle of claim 1, wherein said header further includes at least one actuator connected to the frame and operably connected to said at least one crop divider, and said actuator is configured for at least one of raising, lowering, rearwardly moving, and forwardly moving said at least one crop divider.

8. A header for an agricultural vehicle, comprising:
    a frame;
    at least one crop divider rotatably connected to the frame at an axis of rotation, which is substantially perpendicular to a forward direction, and said at least one crop divider is configured for dividing and lifting a crop material, and said at least one crop divider comprising a spheroidal body; and at least one drive unit mounted to the frame and operably connected to said at least one crop divider such that as the header is moved in the forward direction said at least one drive unit rotates said at least one crop divider about the axis of rotation.

9. The header of claim 8, wherein said at least one crop divider includes a plurality of protuberances.

10. The header of claim 9, wherein said plurality of protuberances are in the form of a plurality of fingers extending outwardly from an outer surface of said at least one crop divider.

11. The header of claim 8, wherein said at least one crop divider includes a plurality of fins configured for contacting the crop material and preventing the crop material from being lodged in between said at least one crop divider and the frame of the header.

12. The header of claim 8, wherein said header has a pair of lateral ends, and said at least one crop divider is in the form of a pair of end crop dividers which are respectively located at the lateral ends of the frame of the header.

13. A method for operating an agricultural vehicle, comprising:

providing a header configured for connecting to the agricultural vehicle, the header including a frame, at least one crop divider rotatably connected to the frame at an axis of rotation, which is substantially perpendicular to a forward direction, and said at least one crop divider comprising a spheroidal body, and at least one drive unit mounted to the frame and operably connected to said at least one crop divider;

rotating said at least one crop divider by said at least one drive unit about the axis of rotation as the header is moved in the forward direction;

dividing a standing crop material by said at least one crop divider; and lifting a down crop material into the header by said at least one crop divider.

14. The method of claim 13, wherein said at least one crop divider includes a plurality of protuberances.

15. The method of claim 14, wherein said plurality of protuberances are in the form of a plurality of fingers extending outwardly from an outer surface of said at least one crop divider.

16. The method of claim 13, wherein said at least one crop divider includes a plurality of fins configured for contacting a crop material and preventing the crop material from being lodged in between said at least one crop divider and the frame of the header.

* * * * *